Oct. 18, 1955     L. A. SAFFORD     2,720,887
PRESSURE REDUCING VALVE WITH OVER PRESSURE RELIEF
Filed Nov. 21, 1952
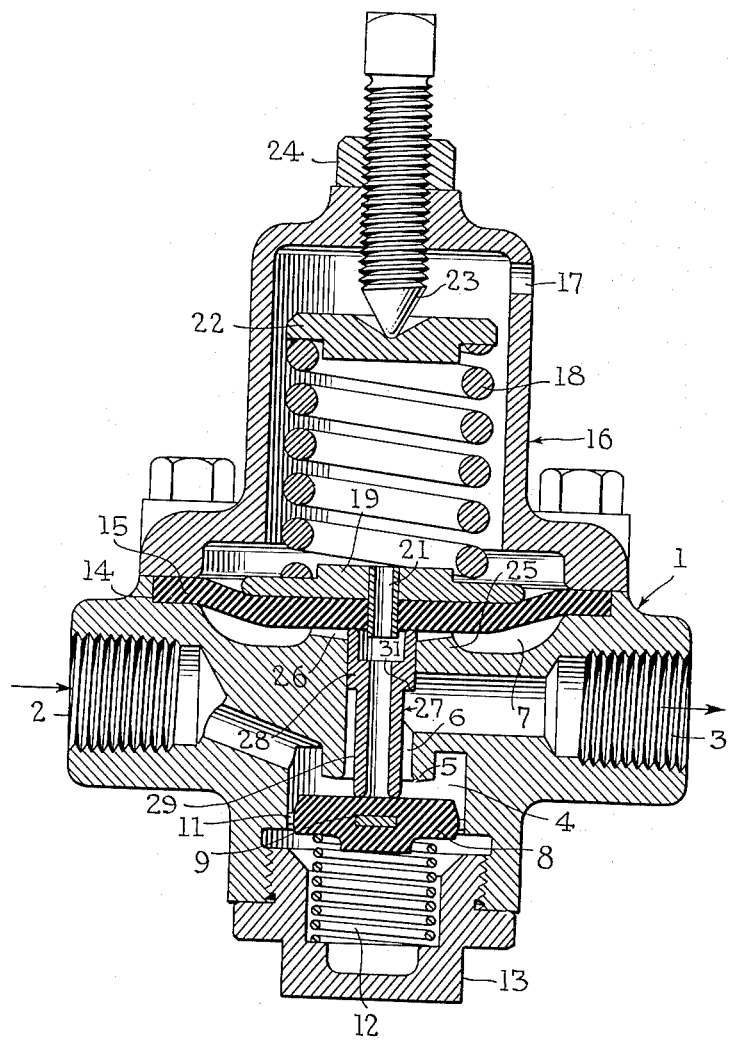
INVENTOR
Lewis A. Safford
BY
ATTORNEYS

United States Patent Office 2,720,887
Patented Oct. 18, 1955

2,720,887

PRESSURE REDUCING VALVE WITH OVER PRESSURE RELIEF

Lewis A. Safford, Watertown, N. Y., assignor to The New York Air Brake Company, a corporation of New Jersey Application November 21, 1952, Serial No. 321,896

1 Claim. (Cl. 137—116.5)

This invention relates to pressure reducing valves of the type in which control is effected in response to pressure on the discharge side of the valve.

The valve uses components whose practicality is demonstrated by long use—a spring-loaded diaphragm subject to low-side pressure and a simple poppet valve—but uses them in an environment so contrived that humming, long considered inevitable, never occurs.

Applicant's assignee has long sought a reliably silent reducing valve for use on the water raising systems of sleeping cars. For that use dissipation of overcharges, such as might be caused by leakage, is a second requirement.

The deceptively simple, almost conventional looking valve shown in the drawing solves both problems without adding parts.

In the drawing the improved valve is shown in axial section in its wide-open position.

Statements of direction refer to the valve as positioned in the drawing. The valve can, however, be used in any position.

The housing 1 has an inlet connection 2 and an outlet connection 3, each shown as threaded. The inlet connection leads to the chamber 4 surrounding the main valve-seat 5 through which seat a cylindrical passage 6 leads to a diaphragm chamber 7 to be described. A lateral branch leads from passage 6 to outlet connection 3.

A poppet valve 8 formed of rubber-like material, with a cruciform metal insert 9 which affords valve-centering fingers 11 coacts with seat 5. The valve is biased toward the seat by a light coil compression spring 12. The spring and valve are removable after unscrewing the plug 13 which serves as a seat and as centering means for the spring.

The diaphragm chamber 7 is a concavity in the upper face of housing 1, surrounded by an annular seat recess 14 for the rubber-like diaphragm 15. The marginal portion of the diaphragm is clamped and held sealed in the seat recess by the lower rim of a bell-shaped housing 16 whose interior is vented to atmosphere at 17.

The diaphragm is loaded by a coil compression spring 18 which reacts downward on a thrust plate 19 overlying the diaphragm. A central port leads through plate 19 and fixed in this is a short tube 21 which extends also through a central port in the diaphragm, and is open at both ends. The upper end of spring 18 is sustained by spring seat 22 whose position may be adjusted by turning screw 23. A lock-nut 24 clamps the screw in its adjusted position.

The diaphragm 15 serves as movable top wall for the chamber 7. Downward motion of plate 19 and the central portion of diaphragm 15 is limited by a central boss 25 in chamber 7. In the boss are grooves 26 leading to the top end of the cylindrical passage 6 which is thus maintained in free communication at all times with the diaphragm chamber 7. The boss 25 never functions as a valve seat.

The valve 8 and the diaphragm 15 are not connected but are mechanically related by a thrust tube generally indicated by the numeral 27. The upper portion of tube 27 takes the form of a cylindrical head 28 which makes a leaky sliding fit in cylindrical passage 6 above the lateral passage leading to discharge connection 3. The tube includes a lower relatively slender portion 29 arranged so that free flow may occur around it, when valve 8 is open, from chamber 4 to outlet connection 3. An annular shoulder 31 separates portions 28 and 29.

The upper end of tubular member 27 engages and seals against the diaphragm 15 at all times. This engagement is maintained by the springs 12 and 18 whenever valve 8 is open. When valve 8 is closed and diaphragm 15 moves to its abnormal position the pressure is connection 3 reacts on shoulder 31 to bias member 27 upward against the diaphragm. When the diaphragm is arrested by boss 25 the tubular member 27 holds valve 8 in its wide open position. As the diaphragm moves upward valve 8 is allowed to close and reaches its tight-closed position at the desired low side pressure. At this pressure there is no outflow from chamber 4 through tubular member 27.

If valve 8 leaks, or if low-side pressure rises above the set value for any other reason diaphragm 15 will rise abnormally and excess pressure will be dissipated from chamber 4. The return of diaphragm 15 to normal position, in which the lower end of member 27 seals against the upper face of valve 8, is retarded by the restricted venting flow from chamber 7 to passage 3 past the upper portion 28.

The critical factor in stable, non-humming operation is the restricted communication afforded by the leaky fit of head 28. This damps out self-perpetuating pressure surges in the diaphragm chamber 7, and also prevents abrupt cessation of the venting flow which would give rise to additional pressure surges. This flow restriction must be maintained within relatively close limits, because if it is excessive the closing of the valve would be sluggish and the valve would hunt.

Motion of head 28 in passage 6 resists clogging accumulations, and the relatively large circumferential extent gives the needed flow area with a very small radial clearance, so that most granular particles, even those of very small size are too large to enter.

Thus the member 27 of elementally simple form accomplishes several purposes. It damps pressure pulses, throttles venting flow, and maintains the flow passage around itself clear, both by excluding clogging substances and by working them out if they enter.

The valve has been built and tested and operates as stated. Variations of detail within the scope of the claim are contemplated.

What is claimed is:

The combination of a valve body enclosing a supply chamber, a communicating supply connection, a valve seat in the supply chamber with a passage leading therethrough, a diaphragm chamber to the center of which said passage leads, and an outlet branch communicating with said passage between the valve seat and the diaphragm chamber and spaced from the latter; a movable diaphragm forming one wall of the diaphragm chamber exposed on its other side to the atmosphere and having a center vent port a poppet valve in the supply chamber and movable to and from said seat in a path alined with the path of the center of the diaphragm; biasing means serving lightly to bias the valve in the closing direction and more heavily bias the central portion of the diaphragm in the opposite direction; and a thrust member free of connection with but interposed between the diaphragm and the valve, through which said diaphragm may react on said valve in an opening direction, said member extending through said passage, and comprising a relatively slender tube which seats at one end on said valve and when so seated seals with the valve, said tube having adjacent its other end a cylindrical enlargement which makes a leaky flow-controlling sliding fit in a part of said passage between the outlet branch and the diaphragm chamber, said enlargement having a terminal rim which seals with said diaphragm around said vent port, the area there circumscribed being materially larger than the area circumscribed by the tube on said valve, whereby the thrust member is pressure-biased toward the diaphragm and moves therewith.

References Cited in the file of this patent

UNITED STATES PATENTS

| | | |
|---|---|---|
| 508,133 | Gold | Nov. 7, 1893 |
| 1,637,085 | Nichols | July 26, 1927 |
| 1,903,338 | Horne | Apr. 4, 1933 |
| 2,252,152 | Work | Aug. 12, 1941 |
| 2,259,809 | Freeman | Oct. 21, 1941 |
| 2,288,733 | Nieseman | July 7, 1942 |